United States Patent
Söllinger et al.

(10) Patent No.: US 12,358,065 B2
(45) Date of Patent: Jul. 15, 2025

(54) METHOD AND WELDING DEVICE FOR CARRYING OUT A MULTIPLE WELDING METHOD

(71) Applicant: Fronius International GmbH, Pettenbach (AT)

(72) Inventors: Dominik Söllinger, Wels-Thalheim (AT); Josef Artelsmair, Wels-Thalheim (AT)

(73) Assignee: Fronius International GmbH, Pettenbach (AT)

( * ) Notice: Subject to any disclaimer, the term of this patent is extended or adjusted under 35 U.S.C. 154(b) by 720 days.

(21) Appl. No.: 17/640,080

(22) PCT Filed: Sep. 2, 2020

(86) PCT No.: PCT/EP2020/074443
§ 371 (c)(1),
(2) Date: Mar. 3, 2022

(87) PCT Pub. No.: WO2021/043812
PCT Pub. Date: Mar. 11, 2021

(65) Prior Publication Data
US 2022/0324048 A1  Oct. 13, 2022

(30) Foreign Application Priority Data

Sep. 4, 2019  (EP) .................................... 19195360

(51) Int. Cl.
*B23K 9/09* (2006.01)
*B23K 9/095* (2006.01)
(Continued)

(52) U.S. Cl.
CPC .............. *B23K 9/092* (2013.01); *B23K 9/095* (2013.01); *B23K 9/167* (2013.01); *B23K 9/296* (2013.01)

(58) Field of Classification Search
CPC ........ B23K 9/092; B23K 9/095; B23K 9/167; B23K 9/295; B23K 9/296; B23K 9/1735
See application file for complete search history.

(56) References Cited

U.S. PATENT DOCUMENTS

2017/0129038 A1  5/2017  Cooper et al.

FOREIGN PATENT DOCUMENTS

| CN | 101417365 | 4/2009 |
| CN | 101844267 | 9/2010 |

(Continued)

OTHER PUBLICATIONS

Machine Translation of Ran, JP0827674, performed on Dec. 6, 2024 (Year: 1996).*

(Continued)

*Primary Examiner* — Brian W Jennison
(74) *Attorney, Agent, or Firm* — GREENBLUM & BERNSTEIN, P.L.C.

(57) ABSTRACT

A multiple welding method and a welding device with at least two electrodes which ensure a welding quality that is as consistent as possible and stable welding processes. A test parameter is applied to one of the at least two welding current circuits before the start or after the end of the multiple welding method and at least one electrical welding parameter is recorded in at least one other welding current circuit, with an electrically conductive connection between the at least two welding current circuits being detected if the recorded welding parameter is influenced by the test parameter and fulfills a predetermined test criterion. Alternatively, at least one electrical welding parameter is recorded in each welding current circuit during the multiple welding method, with an electrically conductive connection between the at least two welding current circuits being detected if the recorded welding parameters change simultaneously.

20 Claims, 4 Drawing Sheets

Figure 1:
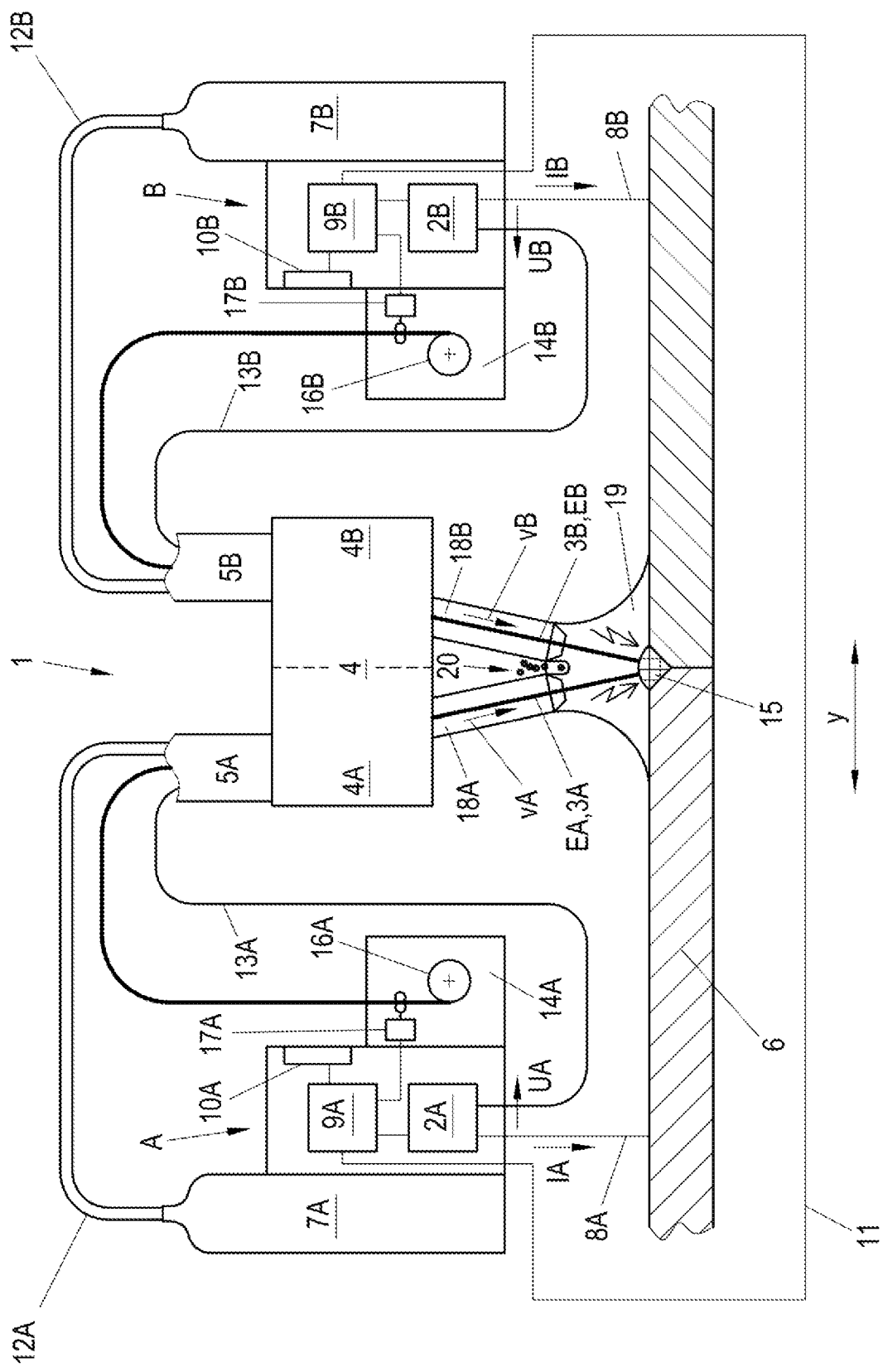

(51) Int. Cl.
  *B23K 9/167* (2006.01)
  *B23K 9/29* (2006.01)

(56) References Cited

FOREIGN PATENT DOCUMENTS

| CN | 102814578 | 12/2012 |
|----|-----------|---------|
| CN | 102962591 | 3/2013 |
| CN | 104014904 | 9/2014 |
| CN | 109202235 | 1/2019 |
| CN | 208680733 | 4/2019 |
| CN | 208772775 | 9/2019 |
| GB | 720367 | 12/1954 |
| JP | S59-156578 | 9/1984 |
| JP | H08-276274 | 10/1996 |
| WO | 97/45227 | 12/1998 |

OTHER PUBLICATIONS

Machine Translation of Artelsmair, WO 97/45227 (Year: 1997).*
Int'l Search Report (PCT/ISA/210) conducted in Int'l Appln. No. PCT/EP2020/074443 (Dec. 8, 2020).
Int'l Written Opinion (PCT/ISA/237) conducted in Int'l Appln. No. PCT/EP2020/074443 (Dec. 8, 2020).
Int'l Prelim. Exam. Report (PCT/IPEA/409) conducted in Int'l Appln. No. PCT/EP2020/074443 (Jul. 2, 2021).
China Office Action conducted in China Appln. No. 202080062148.1 (Jul. 14, 2023).
Qian, "Introduction to the $CO_2$ gas shielded welding spatter causes and control measures," *Silicon Valley*, vol. 5, p. 89 (Mar. 8, 2010).
Zhang et al., "7A52 aluminum alloy single and double wire welding process comparison analysis," *Transactions of the China Welding Institution*, vol. 9, pp. 70-73 (Sep. 25, 2008).

* cited by examiner

METHOD AND WELDING DEVICE FOR CARRYING OUT A MULTIPLE WELDING METHOD

METHOD

The invention relates to a method for carrying out a multiple welding method, in which at least two electrodes each having a welding current circuit are each used to carry out a welding process on a workpiece. The invention also relates to a welding device for carrying out a multiple welding method.

There are currently a number of common welding methods in the prior art. For example, gas metal arc welding (GMAW) processes have been known for many years. These include, for example, the metal inert gas (MIG) method or the metal active gas (MAG) method, in which a consumable electrode made of a metal electrode material is surrounded by a shielding gas. Gas metal arc welding processes are usually used either to apply a weld seam to a base material (build-up welding) or to join two base materials (joint welding). In both cases, an arc is ignited between the electrode and the base material by means of an electric voltage or an electric current resulting therefrom, which arc fuses the electrode and the region of the base material surrounding the arc, creating an integral bond. The same or a similar material as for the base material is usually used as the electrode material. The electrode is supplied to the welding point at a specific electrode feed rate; the electrode feed rate can be specified in a fixed manner, e.g. in manual welding by hand, or can also be dependent on other parameters, for example on a welding speed at which the electrode is moved relative to the base material or depending on the current, etc.

The shielding gas is used to shield the arc and the region of the melt from the atmosphere, substantially to avoid oxidation. Either an inert gas (MIG) or an active gas (MAG) is used as the shielding gas. Inert gases, for example helium (He) or argon (Ar), are gases that do not enter into any chemical reactions with the melt. The MIG method is mainly used for non-ferrous metals and high-alloy steels. Active gases such as carbon dioxide ($CO_2$) or oxygen (O) are highly reactive gases that are used to consciously change the composition of the melt. They are preferably used for unalloyed and low-alloy steels.

Another known welding method is what is known as tungsten inert gas (TIG) welding. In contrast to the GMAW methods mentioned above, the TIG welding method uses a tungsten electrode with a very high melting point so that the electrode is not consumed during welding. The welding filler material is accordingly supplied separately to the welding point in the form of a wire-shaped additive. The welding filler material is melted off in the electric arc burning between the tungsten electrode and the base material. Inert shielding gases analogous to those used in the MIG method are used as shielding gases.

In order for example to increase the melting rate or to be able to feed various additives to a welding point, multiple welding processes are also known in the prior art. For example, WO 97/45227 A1 shows a tandem GMAW welding method in which a plurality of welding wires running parallel to one another are supplied to a common welding torch as consumable electrodes. The welding wires are electrically separated from each other and are each guided in a contact tube. Each welding wire has a separate feed unit for supplying the welding wire to the welding point, as well as its own welding current circuit with a welding current source. This means that each welding wire can be used to carry out its own welding process, which is substantially independent of the other welding wire. This allows the melting rate to be increased compared to conventional GMAW methods with only one welding wire. Of course, more than two welding processes can also be carried out in a multiple welding method.

In order to carry out a defined welding process on an electrode, specific welding parameters are usually set on the welding tool, for example by a suitable control unit of a welding tool. Such welding parameters are e.g. a welding voltage, a welding current and a welding wire feed speed of the consumable electrode (MIG/MAG) or the additive (TIG), wherein different welding parameters can be set for different welding processes of the multiple welding process. The welding tool can also record an electrical measurement variable while the welding process is being carried out, for example the welding voltage, the welding current or an electrical resistance of the welding current circuit.

The recorded measurement variable can then be processed by the welding tool in order to monitor, control or regulate the welding process. Known welding processes that are carried out with a welding tool are, for example, a pulse welding process, a short arc welding process or a short arc welding process with reversing wire electrode (e.g. a cold metal transfer welding process), although there are of course also other welding processes such as a spray arc welding process, mixed processes, welding process with a rotating arc, etc. In the welding processes mentioned, a defined cyclical change in the welding current can take place in the welding current circuit in question, which leads to improved droplet detachment of the consumable electrode or the additive.

A common problem with such multiple welding processes is that so-called spatter bridges consisting of the material of the welding electrode (MSG) or the additive (TIG) can form due to welding spatter between two or more electrodes arranged close to each other. In the tandem welding process mentioned, these spatter bridges form for example between the adjacent contact tubes of the welding torch through which the welding wires are guided. This can lead to an undesired electrical connection between the contact tubes which are otherwise electrically isolated from one another, and thus to an electrically conductive connection of the two separate welding current circuits. This can lead to mutual interference between the welding current circuits, which can lead to unstable welding processes. A consequence of this can be, for example, that there is no longer a guaranteed droplet detachment, which can lead to reduced welding quality.

JP H08276274 A and JP S59156578 A disclose methods for detecting a short circuit between a contact sleeve and a gas nozzle surrounding the contact sleeve on a single welding torch. The methods are relatively complex because a separate detection circuit having its own current source is required.

It is therefore the object of the invention to provide a method for carrying out a multiple welding method and a welding device for carrying out a multiple welding method with at least two electrodes which ensure a welding quality that is as consistent as possible and stable to welding processes.

The object is achieved according to the invention in that a test parameter is applied to one of the at least two welding current circuits before the start or after the end of the multiple welding method and at least one electrical welding parameter is recorded in at least one other welding current circuit, with an electrically conductive connection between the at least two welding current circuits being detected if the recorded welding parameter is influenced by the test parameter and fulfills a specified test criterion, or in that at least one electrical welding parameter is recorded in each welding current circuit during the multiple welding method, with an electrically conductive connection between the at least two welding current circuits being detected if the recorded welding parameters change simultaneously. As a result, an electrically conductive connection between two welding current circuits, which is produced for example by a spatter bridge formed from welding spatter between two electrodes during the welding process, is reliably detected.

A consumable electrode in the form of a welding wire is preferably provided for at least one electrode, with the welding wire being supplied to a welding point on the workpiece and being melted off at the welding point by an arc which burns between the welding wire and the workpiece and is controlled by the relevant welding process in order to form a weld seam. As a result, e.g. the known MIG/MAG welding method can be carried out on one or more electrodes.

Furthermore, it is advantageous if a non-consumable electrode is provided for at least one electrode, with an additive being supplied to a welding point on the workpiece and the additive being melted off at the welding point by an arc which burns between the non-consumable electrode and the workpiece and is controlled by the relevant welding process in order to form a weld seam. As a result, e.g. the known TIG welding method can be carried out on one or more electrodes.

A pulse welding process, a welding process with reversing welding wire feed, a spray arc welding process, a welding process with a rotating arc or a short arc welding process is preferably used for at least one welding process of an electrode. This means that an electrically conductive connection can be detected in the most common welding processes.

A welding current, a welding voltage, a welding resistance or a period duration or pulse frequency of a welding cycle of a welding process or a variable derived therefrom, preferably a welding power, is preferably used as the electrical welding parameter, and/or a test voltage, a test current or a variable derived therefrom is provided as the test parameter. Known variables can thus be used in a simple manner as welding parameters and/or test parameters in order to detect a spatter bridge.

If a current-controlled welding process is used on at least one electrode in which a welding to current of the welding current circuit is regulated, or a voltage-controlled welding process is used in which a welding voltage of the welding current circuit is regulated, it is advantageous if, in the current-controlled welding process, an electrical welding parameter different from the welding current is recorded and, in the voltage-controlled welding process, an electrical welding parameter different from the welding voltage is recorded, in order to detect the electrically conductive connection. This can prevent using welding parameters for the detection of a spatter bridge which, under certain circumstances, would not change or would change only very slightly due to the regulation.

It is advantageous if, when the electrically conductive connection between the at least two welding current circuits is detected, a preferably analogue, digital, acoustic, optical or haptic signal is generated before the start or after the end of the multiple welding method and/or, when the electrically conductive connection between the at least two welding current circuits is detected during the multiple welding method that is being carried out, the multiple welding method is interrupted and/or a preferably analogue, digital, acoustic, optical or haptic signal is generated. As a result, the presence of an electrically conductive connection can be signaled to a user or a higher-level controller, such as a welding robot. The user, welding robot, etc. can then take suitable measures, for example cleaning the welding device.

The object is further achieved with a welding device in that the control unit of at least one electrode is provided to apply a test parameter to the welding current circuit of the relevant electrode before the start or after the end of the multiple welding, method and in that the control unit of at least one other electrode is provided to record at least one electrical welding parameter in the welding current circuit of the relevant electrode, and the welding device is provided to detect an electrically conductive connection between the at least two welding current circuits if the recorded welding parameter is influenced by the test parameter and a specified test criterion is fulfilled or in that the control units of the at least two electrodes are provided to each record at least one electrical welding parameter in their welding current circuit during the multiple welding method and in that the welding device is provided to detect an electrically conductive connection between the at least two welding current circuits if the recorded welding parameters change simultaneously.

Figure 2:
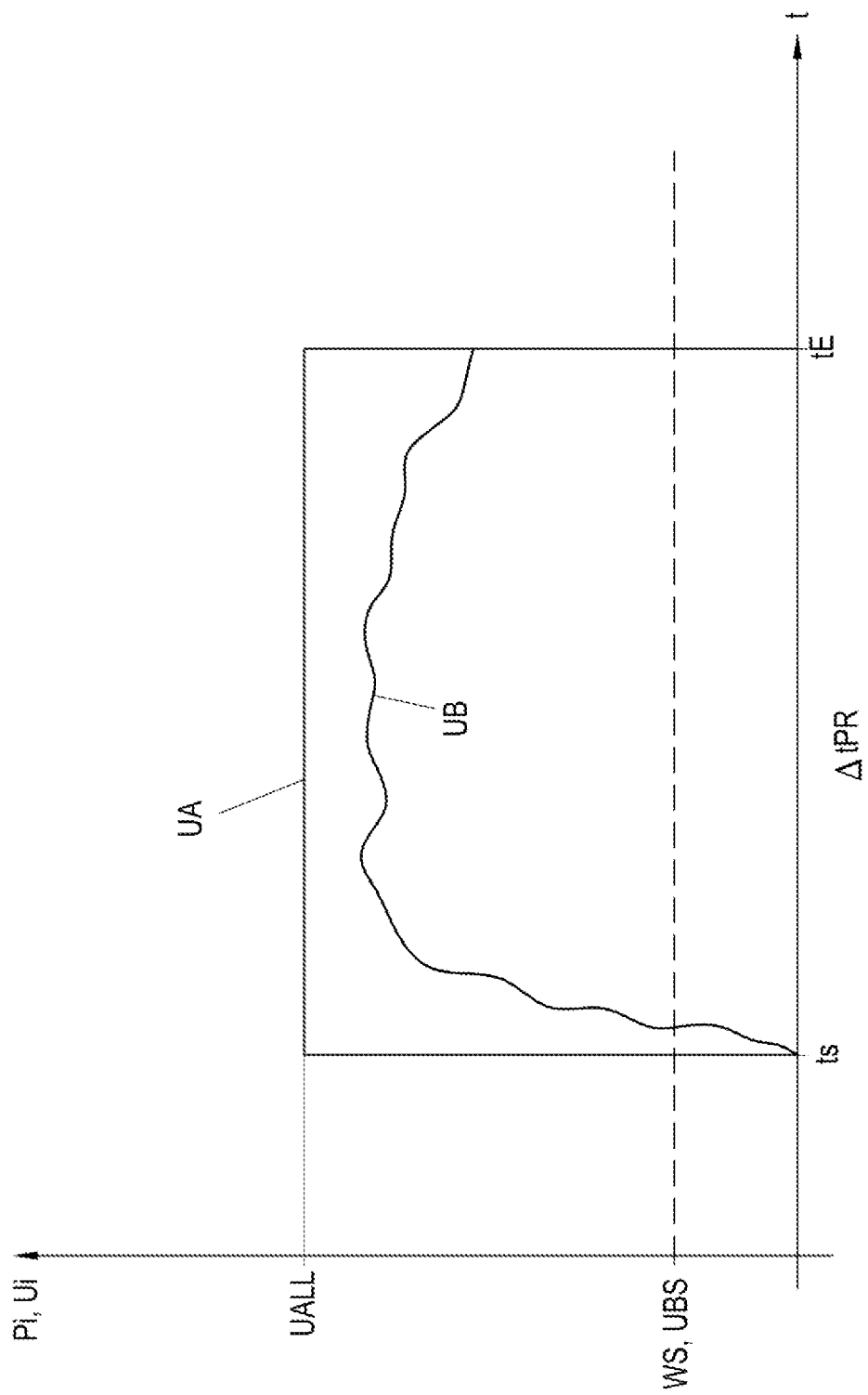
Figure 3:
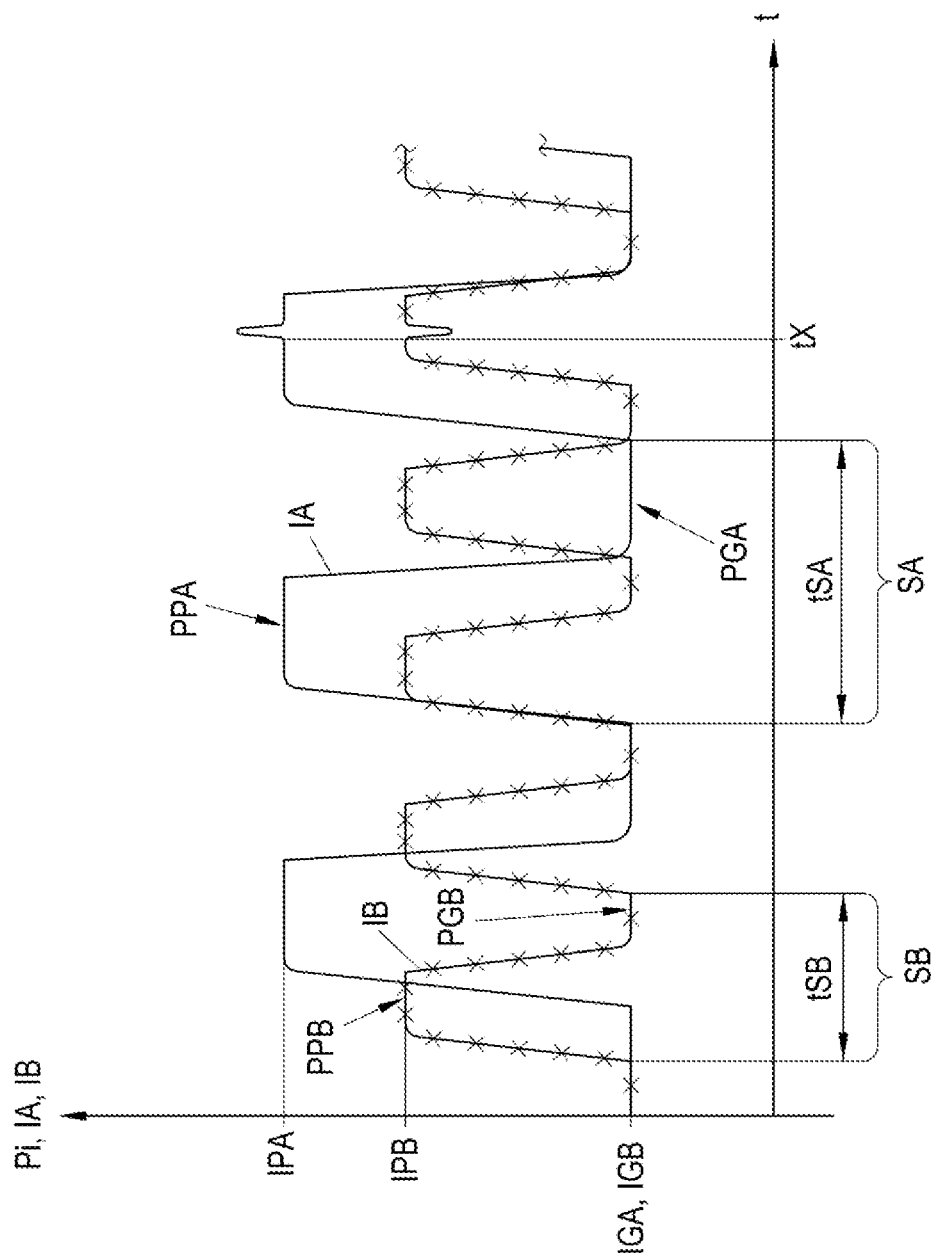
Figure 4:
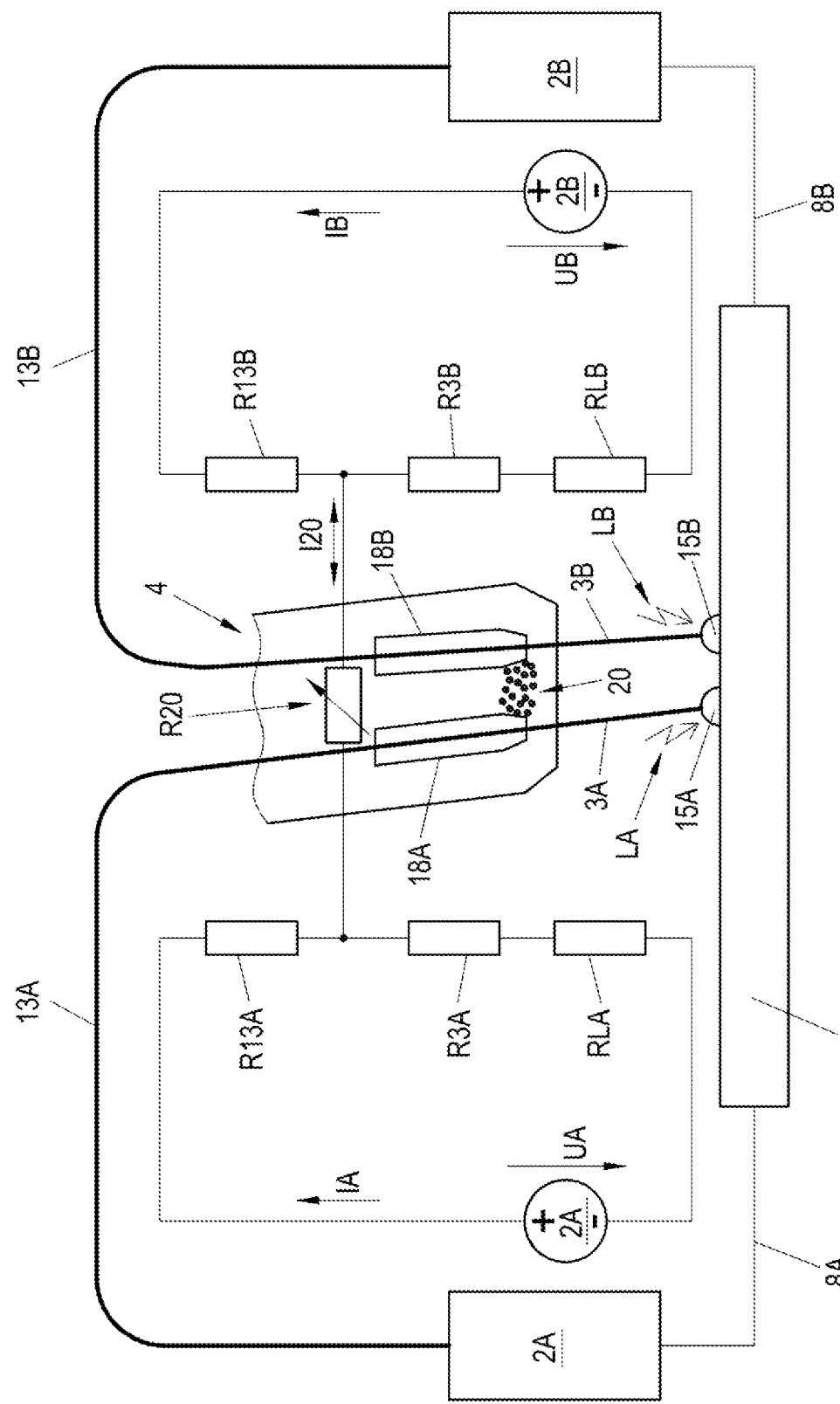

The present invention is described in greater detail below with reference to FIGS. 1 to 4, which show exemplary, schematic and non-limiting advantageous embodiments of the invention. In the drawings:

FIG. 1 shows the basic structure of a welding torch with two electrodes for carrying out a multiple welding method, FIG. 2 shows time curves of the welding voltages of the welding current circuits of the two electrodes in a first embodiment of the method according to the invention, FIG. 3 shows times curves of the welding parameters Pi of the welding current circuits of the two electrodes in a second embodiment of the method according to the invention, FIG. 4 shows an electrical equivalent circuit diagram of a welding device.

FIG. 1 is a simplified view of a welding device 1 having two mutually independent welding tools A, B. In this case, the welding tools A, B are designed as welding tools having a consumable electrode (MIG/MAG welding). In principle, however, one or more welding tools having a non-consumable electrode (TIG welding) with automatic welding wire feed of a filler material could also be used. In the example shown, the two welding tools A, B are each used to carry out a welding process on a common workpiece 6. Of course, more than two welding tools A, B could also be provided, but the arrangement of two welding tools A, B is sufficient for understanding the invention. The welding tools A, B do not necessarily have to be designed as separate units, but it would also be conceivable for the two (or more) welding tools A, B to be arranged, for example, in a common housing. However, this does not change the fact that each welding tool A, B forms its own welding current circuit for carrying out a welding process.

The welding tools A, B each have a welding current source 2A, 2B, a welding wire feed unit 14A, 14B and a common welding torch 4 (MIG/MAG welding tools) on which the electrodes are arranged. The welding current sources 2A, 2B each provide the required welding voltage UA, UB, which is applied in each case via a contact tube 18A, 18B to a welding wire 3A, 3B as a consumable electrode (or to a non-consumable electrode in the case of a welding method having a non-consumable electrode such as TIG welding). The welding wire 3A, 3B is supplied to a common welding torch 4 by means of the welding wire feed unit 14A, 14B at a certain welding wire feed speed vA, vB.

The supply can take place, for example, within a hose pack 5A, 5B or also outside thereof. The welding wire feed unit 14A, 14B can in each case be integrated in the welding tool A, B, but can also be a separate unit, as shown in FIG. 1. Within the welding wire feed unit 14A, 14B, for example, a wire roll 16A, 16B can be provided on which the welding wire 3A, 3B is wound. However, the welding wire 3A, 3B could e.g. also be arranged in a container such as a barrel and supplied from there to the welding torch 4. Furthermore, a suitable drive unit 17A, 17B can be provided which is actuated by the control unit 9A, 9B in order to unwind the welding wire 3A, 3B from the wire roll 16A, 16B or from the container and supply said welding wire to the welding torch 4 at a welding wire feed speed vA, vB.

To carry out a welding process, an arc is ignited in each case between the welding wire 3A, 3B and the workpiece 6, as is shown here by the lightning bolts. On the one hand, the material of the workpiece 6 is locally melted by the arc and a weld pool 15 is generated. On the other hand, the welding wire 3A, 3B is supplied to the weld pool 15 by means of a certain welding wire feed speed vA, vB and is melted off by the arc in order to apply material of the welding additive (in this case the welding wires 3A, 3B as consumable electrodes) to the workpiece 6. When the welding torch 4 moves relative to the workpiece 6, a weld seam can thereby be formed (in FIG. 1 for example in the direction normal to the plane of the drawing).

In each hose pack 5A, 5B, further lines can optionally also be provided between the welding tool A, B and the welding torch 4 (for example a control line (not shown) or a coolant line). A shielding gas is often used in order to shield the weld pool 15 from the ambient air, in particular the oxygen contained therein, by means of a shielding gas bell 19 in order to prevent oxidation. As a rule, inert gases (e.g. argon), active gases (e.g. $CO_2$) or mixtures thereof are used which can also be supplied to the welding torch 4 via the relevant hose pack 5A, 5B by means of suitable shielding gas lines 12A, 12B. The shielding gases are usually stored in separate (pressure) containers 7A, 7B which can be supplied to the welding tools A, B (or directly to the welding torch 4) e.g. via suitable lines. If the same shielding gas is used, a common container for both (all) welding tools A, B could also be provided. Of course, welding can also be carried out without shielding gas if necessary. The hose pack 5A, 5B can be coupled to the welding torch 4 and to the welding tool A, B e.g. via suitable couplings.

In order to form a welding current circuit of each of the welding tools A, B, the welding current sources 2A, 2B are each connected to the workpiece 6 by a ground line 8A, 8B. One pole of the welding current source 2A, 2B, usually the negative pole, is connected to the ground line 8A, 8B. The other pole of the welding current source 2A, 2B, usually the positive pole, is connected to the contact tube 18A, 18B (or vice versa) via a suitable current line 13A, 13B. The contact tube 18A, 18B through which the wire electrode 3A, 3B is passed transmits the current to the consumable electrode EA, EB (or the welding wire 3A, 3B). A welding current circuit is thus formed for each welding process via the arc and the workpiece 6.

A control unit 9A, 9B is also provided in each of the welding tools A, B to control and monitor the relevant welding process, including the relevant welding wire feed. For this purpose, the welding parameters required for the welding process, such as the welding wire feed speed vA, vB, the welding current IA, IB, the welding voltage UA, UB, the pulse frequency, the pulse current duration, etc. are specified or can be set in the control unit 9A, 9B. To control the welding process, the control unit 9A, 9B is connected to the welding current source 2A, 2B and the welding wire feed unit 14A, 14B (e.g. in particular the drive unit 17A, 17B).

A user interface 10A, 10B connected to the control unit 9A, 9B can also be provided for input or display of certain welding parameters Pi or a welding status. Furthermore, a suitable interface (not shown) could also be provided on the welding tool A, B via which the welding tool A, B can be connected to an external control unit by which the welding tool A, B is controlled. For example, a central control unit (not shown) could be provided which is connected to both welding tools A, B (or a plurality of welding tools) and via which the welding processes of the welding tools A, B can be controlled. The described welding tools A, B are of course well known, which is why they will not be discussed in more detail at this point.

The common welding torch 4 in the example shown is designed such that the at least two electrodes EA, EB are fixed in a predetermined position relative to one another on the welding torch 4 so that the welding wires 3A, 3B are supplied to a common weld pool 15. However, the welding torch 4 could also be designed in such a way that the welding wires 3A, 3B on the workpiece 6 work in two separate weld pools instead of in a common weld pool 15, as shown in FIG. 1. However, two separate welding torches 4A, 4B could also be provided, as indicated by dashed lines in FIG. 1, which are arranged in a fixed or movable manner relative to one another.

For example, the two welding torches 4A, 4B could be arranged on a welding robot (not shown) which guides the two welding torches 4A, 4B, The arrangement can, however, also be variable, for example in that one welding torch 4A, 4B each is guided by a welding robot. Instead of a welding robot, another suitable manipulation device can of course also be provided, for example a type of gantry crane, which preferably allows movement in a plurality of axes, preferably three. It is irrelevant whether the welding torches 4, 4A, 4B are used for joint welding or build-up welding or another welding method. Manual welding would of course also be possible.

The control units 9A, 9B of the welding tools A, B are preferably connected by means of a communication link 11 via which synchronization information Y can be exchanged unilaterally or reciprocally between the welding tools A, B. The communication link 11 can be, for example, a wired or wireless connection between the control units 9A, 9B or between the user interfaces 10A, 10B, e.g. a well-known data bus. For example, the welding tools A, B and/or the welding robot that moves the welding torch 4 (or multiple welding robots for multiple welding torches 4A, 4B) could communicate with one another via a suitable communication link (not shown) and be connected to a central control unit.

Synchronization information Y can contain for example information about welding parameters Pi of the welding processes carried out with the welding tools A, B, for example information about the magnitude or the time curve of the welding voltage UA, UB, the welding current IA, IB, the wire feed speed vA, vB, or for example information about a period duration or a pulse frequency of a pulse welding process etc. Through the exchange of synchronization information Y, a control unit 9A, 9B knows the relevant welding parameters Pi of the other control unit 9A, 9B, which means that the welding processes carried out can be coordinated with one another e.g. in terms of time. For example, identical welding processes with quantitatively identical welding parameters, which are simply shifted in time by a phase shift, could be carried out on both electrodes.

However, the communication link 11 is only optional for the invention and is preferably provided e.g. when a pulse welding process is carried out with each of the two welding tools A, B. By exchanging synchronization information Y between the control units 9A, 9B, the pulse welding processes (which can also have different welding parameters Pi) can be synchronized with one another. In other welding processes, such as a spray arc process, it is not absolutely necessary to coordinate the two spray arc processes. A communication link 11 can therefore also be dispensed with in this case. However, if different welding processes can be carried out with the two (or more) welding tools A, B (which is usually the case), it is advantageous if a communication link 11 is provided between the control units 9A, 9B, . . . n of the welding tools A, B, . . . n (n is a general index and represents the number of individual welding tools). The communication link 11 can then also be used advantageously for the method according to the invention for detecting an electrically conductive connection 20.

During welding, welding spatter is usually formed which is released from the weld pool 15 and moves toward the welding torch 4. This welding spatter can stick to the contact tubes 18A, 18B and solidify, for example. Such welding spatter constitutes droplets of molten metal and can be e.g. a mixture of the material of the workplace 6 and/or the material of the welding wires 3A, 3B. Such an adhesion of the welding spatter to the contact tubes 18A, 18B is in principle unproblematic. However, after some time, for example after several lengthy welding operations, one or more so-called spatter bridges can form between the contact tubes 18A, 18B (or other current-carrying parts of the electrodes) on the welding torch 4, as indicated in FIG. 1, Such spatter bridges can lead to an electrically conductive connection 20 between the welding current circuits that are normally electrically isolated from another of the (in this case two) electrodes EA, EB. Such an electrically conductive connection 20 is of course undesirable because it can lead to an unstable welding process on one or more electrodes EA, EB. Such an electrically conductive connection 20 can be effectively detected by the method according to the invention, as will be explained in more detail below with reference to FIG. 2 and FIG. 3.

FIG. 2 shows a first embodiment of the invention using a diagram of the voltages Ui of the (in this case) two welding current circuits over time t (i is a general index and stands for the individual welding current circuits). According to the first embodiment, a test parameter is applied to one of the at least two welding current circuits before the start or after the end of the multiple welding method (i.e. not during the multiple welding method). The test parameter can be, for example, a certain specified electrical variable, in particular a test voltage Uip, a test current or a variable derived therefrom. The test voltage Uip can be e.g. an open-circuit voltage UiLL, another constant voltage Ui of a specified magnitude or also any specified time curve U(t) of a voltage Ui, e.g. a sinusoidal or pulsed curve or the like. The open-circuit voltage UiLL is substantially characterized, for example, by the fact that there is no load on the welding current circuit, i.e. no arc is ignited. In an analogous manner, of course, another constant or time-variable electrical variable could also be used as the test parameter.

In the example shown, a test voltage Uip, in this case in the form of an open-circuit voltage UALL, is applied to the welding current circuit of the first welding tool A as the test parameter, but of course a (not shown) test voltage (or another test parameter) could also be applied to the welding current circuit of the second welding tool B (or to the welding current circuit of another welding tool if the welding device 1 has more than two electrodes or welding tools). In at least one other welding current circuit, in this case in the welding current circuit of the welding tool B, at least one electrical welding parameter Pi of the welding current circuit is recorded, in this case for example the voltage UB, although alternatively a current or an electrical resistance or another suitable electrical welding parameter could also be recorded.

An electrical welding parameter Pi could, for example, also be a variable derived from other welding parameters Pi, such as the welding power $PSi=Ui*Ii$.

In order to control/regulate a welding process, a welding parameter Pi is often recorded in the relevant welding current circuit and processed by the control unit, and so a separate measuring device is not required in this case. Naturally, however, the recording could take place, for example, using a suitable measuring device that communicates with the relevant control unit 9A, 9B.

An electrically conductive connection 20 between the at least two welding current circuits is detected if the recorded welding parameter Pi (in this case the voltage UB) fulfills a certain test criterion in response to the test parameter (in this case e.g. in response to the open-circuit voltage UALL as the test voltage Uip). In the example shown, a certain specified threshold value WS (in this case threshold voltage UBS) is provided as the test criterion, and the electrically conductive connection 20 is detected if the threshold value WS is reached or exceeded. However, a function of the test parameter, in this case e.g. a function f(Uip) of the open-circuit voltage UALL as the test voltage Uip, could also be provided as the test criterion, which function must be fulfilled in order to detect the electrically conductive connection 20.

For example, one electrode (e.g. the welding wire 3A) could also touch the workpiece 6 while the other electrode(s) (in this case e.g. the welding wire 3B) does not touch the workpiece 6. The welding current circuit of the non-touching electrode (welding wire 3B) can then be subjected e.g. to a test current as the test parameter. Normally (because the welding current circuits are electrically isolated from another), no current flows in the welding current circuit of the touching electrode (welding wire 3A). However, if there is an electrically conductive connection 20 between the welding current circuits in the form of a spatter bridge, a current will flow in the welding current circuit of the touching electrode (welding wire 3A). According to the invention, this current can be recorded as the welding parameter Pi in the welding current circuit of the touching electrode (welding wire 3A) and the electrically conductive connection 20 can be detected if the current fulfills a certain test criterion (e.g. reaches/exceeds a specified threshold value WS).

For example, a test voltage Uip in the form of a sinusoidal voltage could also be applied to a welding current circuit as the test parameter, and an expected sinusoidal response of the recorded welding parameter Pi in the other welding current circuit as a function f(Uip) could be provided as the test criterion. The electrically conductive connection 20 is detected when the control unit 9i (or a suitable measuring device) of the welding current circuit in which the welding parameter Pi is recorded determines a curve of the welding parameter Pi that corresponds to the specified test criterion. If a communication link 11 is provided between the control units 9i, however, e.g. the control unit 9i of the welding current circuit to which the test parameter (in this case the open-circuit voltage UALL as the test voltage Uip) is applied could also receive the recorded welding parameter Pi in the other welding current circuit as a synchronization signal Y from the and detect the electrically conductive connection 20 itself. An external testing unit (not shown) could of course also be provided, which unit communicates with the control unit(s) 9i in order to obtain information about the recorded welding parameter(s) Pi. In this way, the electrically conductive connection 20 could be detected by the test unit.

In the example shown, a test period ΔtPR is defined between a test start is and a test end tE. During the test period ΔtPR, the test voltage Uip in the form of the open-circuit voltage UALL is applied as the test parameter to the welding current circuit of the welding tool A and the welding parameter Pi is recorded or measured in the other welding current circuit, in this case the voltage UB. The magnitude of the open-circuit voltage UALL and the duration of the test period ΔtPR can be set in a fixed manner, e.g. via a test program implemented in the control unit 9A, or can also be specified, for example via the relevant user interface 10A. Without an electrical connection 20, the open-circuit voltage UALL in one welding current circuit does not affect the welding current circuit of the other welding current circuit. With an electrical connection 20, on the other hand, this does occur, with the type and effect of the influence being substantially dependent on the ohmic resistance R20 (see FIG. 4) of the electrical connection 20.

If the threshold voltage UBS (as the test criterion) is reached or exceeded, this means that there is an electrically conductive connection 20 between the two welding current circuits, which is caused in particular by a spatter bridge between the contact tubes 18A, 18B of the welding torch 4 (FIG. 1). The level of the threshold value WS, in this case the threshold voltage UBS, can of course also be preset, for example in a test program implemented in the control unit 9B, or can also be specified, for example via the user interface 10B. In the simplest case e.g. a threshold value WS=0, in this case a threshold voltage UBS=0, can be provided, which must be exceeded in order to detect a spatter bridge. It would also be conceivable e.g. that the threshold value WS must be reached continuously during a certain specified or settable time in order to trigger a valid detection of the electrically conductive connection 20. This could prevent short peaks of the recorded welding parameter Pi from being detected as an electrically conductive connection 20, which peaks can be triggered e.g. by external interference.

It would be conceivable, for example, for a test program to be implemented only in the control unit 9i of the welding current circuit to which the test parameter (in this case the open-circuit voltage UiLL as the test voltage Uip) is applied. The test program could then either be started manually by a user or preferably also automatically. For example, the test program could be started automatically after each switching-on process of the welding device 1. When the test program is started, the control unit 9i (here 9A) could e.g. send corresponding synchronization information Y to the control unit 9i (here 9B) of the at least one other welding device (here B) in order to signal the start tS of the test program to the control unit 9B. Upon receipt of the synchronization information Y, the control unit 9B starts, preferably without delay, with the recording of the welding parameter Pi in the welding current circuit of the second welding device B, in this case the voltage UB. To end the test program, synchronization information Y can be sent again from the control unit 9A to the control unit 9B. As a result, the control unit 9B knows the end time tE and ends the recording of the welding parameter.

If the test criterion is not fulfilled, e.g. if the measured value of the welding parameter Pi (in this case welding voltage UB) is below the preset threshold value WS (in this case threshold voltage UBS), this means that there is no electrically conductive connection 20 between the welding current circuits due to a spatter bridge. This means that the multiple welding method can be continued normally, e.g. if the test was carried out before the multiple welding method started. By defining a threshold value WS>0, for example, sufficiently small values Pi<WS of a measured welding parameter Pi can be ignored when detecting the electrically conductive connection 20. As a result, e.g. very low measured values of a welding parameter Pi, which can be caused e.g. by electromagnetic induction, can be disregarded.

If the specified test criterion is fulfilled, for example because the measured welding parameter Pi reaches or exceeds the threshold value WS, this means that there is an electrically conductive connection 20 between the welding current circuits due to a spatter bridge. In this case it is advantageous if the welding torch 4 is cleaned before the multiple welding method is started. For example, a cleaning station with a cleaning means could be provided, into which the welding torch 4 is moved. This can be done manually by a user or preferably automatically, e.g. by a welding robot. In the simplest case, however, a user could visually check the welding torch 4 and manually remove a spatter bridge using a suitable tool. However, particularly in the case of time-critical welding work, cleaning can sometimes be dispensed with and the multiple welding method can be carried out if necessary with a lower welding quality, despite a spatter bridge being detected.

A positive test (in the sense of non-detection of an electrically conductive connection 20 between the welding current circuits) and/or a negative test (in the sense of detection of an electrically conductive connection 20 between the welding current circuits) can advantageously also be signaled to the user by means of a suitable signaling unit, for example by an acoustic, optical or haptic signal. The signaling unit can be integrated e.g. in the welding device 1, for example in the form of a lamp or a loudspeaker, etc. If the user interface 10A, 10B is in the form of a display, a signal message could also be shown on the display. Haptic feedback to the welder would also be conceivable, e.g. in the form of a vibration of the welding torch 4. However, an analog or digital signal could also be output, which is sent e.g. from the relevant control unit 9A, 9B to a higher-level control unit and processed by it, for example by the control unit of a welding robot. The control unit of the welding robot can then respond depending on the signal and e.g. initiate a cleaning process for the welding device 1.

FIG. 3 shows a second embodiment of the invention using a diagram of the welding currents IA, IB as welding parameters Pi of the (in this case) two welding current circuits over time t. In this example, a pulse welding process is carried out with each of the two welding tools A, B, but of course other known welding processes could also be carried out, for example a short arc welding process, a spray arc welding process, a welding process with reversing welding wire feed (cold metal transfer welding process), or a rotating arc etc. It would also be conceivable to combine different welding processes, thus e.g. a pulse welding process with welding tool A and a spray arc welding process with welding tool B. The various welding processes are known to a person skilled in the art. The solid line represents the curve of the welding current IA of the welding tool A, and the line provided with markers represents the curve of the welding current IB of the welding tool B.

During the pulse welding shown as an example, a base current IG and a pulse current IP which is higher than said base current alternate periodically at a specified pulse frequency f. The pulse frequency f results as the reciprocal of the period duration tSA, tSB of a welding cycle SA, SB consisting of a pulse current phase PP having the pulse current IP and a base current phase PG having the base current IG. Preferably, a welding droplet is released into to the weld pool 15 during the pulse current phase PP. The pulse frequency f and/or the value of the base current IG or pulse current IP can also change during a welding process. The time curves of the welding currents IG, IP are of course idealized and are shown in a simplified manner in FIG. 3. Often short intermediate current pulses (not shown) are provided in the base current phase PG in order to increase the process stability. However, this does not change the period duration tSA, tSB of a welding cycle SA, SB and the resulting pulse frequency fA, fB.

Depending on the wire diameter and the electrode material, the welding wire feed speed vA, vB, the welding currents IA, IB, the base current and pulse current durations and the pulse frequency fA, fB of the relevant pulse welding process are preferably coordinated in such a way that a droplet is generated and detached with each current pulse. The welding wire feed speed vA, vB and pulse frequency fA, fB are generally dependent on one another. The curves of the welding currents IA, IB in FIG. 3 have the same base currents IGA=IGB, but different pulse currents IPA≠IPB, and the period durations tSA>tSB of the welding cycles SA, SB also differ. Of course, the curves could also be identical with or without a temporal phase shift of the welding cycles SA, SB. The various welding parameters Pi can be set for example via the user interfaces 10A, 10B and are advantageously adapted by the user to the respective requirements of the multiple welding method to be carried out. For example, certain preset welding programs may also be stored, which can be selected by the user. The control units 9A, 9B can exchange synchronization information Y via the optional communication link 11 in order to synchronize the pulse welding processes.

In order to detect an electrically conductive connection 20 between the (in this case) two welding current circuits, caused in particular by a spatter bridge, an electrical welding parameter Pi is recorded in each welding current circuit during the multiple welding method, with the electrically conductive connection 20 between the at least two welding current circuits being detected if the at least two recorded welding parameters Pi change simultaneously. This is of course a change that does not originate from the welding process itself, for example an edge of a current pulse in a pulse welding process. The change can take place e.g. substantially abruptly, as shown in FIG. 3, but could also have a flatter slope, for example steadily increasing.

In the example shown, this is a current-controlled method, which means that the welding current IA, IB is regulated by the relevant control unit 9A, 9B and the welding voltage UA, UB results on the basis of the resistance in the welding current circuit. In this case, the welding current IA, IB can also be used as the welding parameter Pi to detect the electrically conductive connection 20, but advantageously a welding parameter Pi other than the welding current IA, IB is advantageously used to detect the electrically conductive connection 20, for example the welding voltage UA, UB, the welding resistance or the period durations tSA, tSB, pulse frequency fA, fB, etc. If, for example, a voltage-controlled method is used, a welding parameter Pi other than the welding voltage UA, UB is preferably used to detect the electrically conductive connection 20. However, mixed operation between current-guided and voltage-guided would also be conceivable, in which certain deviations are permissible both in the welding current IA, IB and in the welding voltage UA, UB. The welding voltage UA, UB is then preferably used as the welding parameter Pi for detecting the electrically conductive connection 20.

For the sake of simplicity, the method according to the invention is shown in FIG. 3 using the welding current IA, IB as the recorded welding parameter Pi. In the example shown in, a substantially abrupt change in the relevant welding current IA, IB occurs simultaneously in both welding current circuits at time tX, which indicates an electrically conductive connection 20 between the welding current circuits. In the example shown, both control units 9A, 9B each continuously record the welding current IA, IB as the welding parameter Pi and exchange the information e.g. via the communication link 11. At least one control unit 9A, 9B compares the recorded curves in order to detect a simultaneous, in particular abrupt, change in the welding parameters Pi (in this case IA, IB). Of course, simultaneous does not mean that the changes have to take place exactly at the same time, but rather there can be certain slight time delays. For example, such a time delay can result from inductances in the welding current circuits, from latency times of an analog-to-digital converter or, more generally, from the inertia of the electrical system. In the context of the invention, simultaneous is therefore generally understood to mean that the start of the interdependent abrupt changes in the recorded welding parameters Pi in the welding current circuits (in this case of the two welding currents IA, IB) is within a few milliseconds.

However, it would also be conceivable here for a specific time tolerance ±Δt to be specified or set within which the occurring deviations can occur in order to still be identified as simultaneous. The time tolerance ±Δt could e.g. be permanently specified in the test program or could be set via the user interfaces 10A, 10B. As in the first embodiment, an absolute or relative threshold value WS for the recorded welding parameter Pi, in this case e.g. ±IA, ±IB, which must be reached or exceeded to detect an electrically conductive connection 20 between the welding current circuits, could also be provided here in an analogous manner. For example, in the example shown, instead of the welding current IA, IB, the pulse frequency fA, fB could also be used in order to detect an electrically conductive connection 20 between the welding current circuits. The pulse frequency fA, fB is known in principle, for example from a specified pulse welding process, or can be set. If the pulse frequency fA, fB in the welding current circuits then changes simultaneously, this change can be used to detect the electrically conductive connection 20 between the welding current circuits.

The communication link 11 between the welding tools A, B is not absolutely necessary for both embodiments of the method, but it is of course advantageous. In the first embodiment, for example, the test parameter (e.g. a test voltage Uip) could be applied in one of the welding current circuits and the welding parameter Pi could be recorded in the other welding current circuit, without synchronization information Y having to be exchanged. If a communication link 11 is provided between the welding tools A, B, this could be used in an advantageous manner so that the control unit 9$i$ of the welding current circuit to which the test parameter is applied also takes over the evaluation of the welding parameter Pi recorded in the other welding current circuit in order to detect the electrically conductive connection 20. However, e.g. an external testing unit which is connected to the control units 9$i$ in order to detect the electrically conductive connection 20 could also be provided in the welding device 1.

In the second embodiment, the comparison and evaluation of the welding parameters Pi recorded in the two (or more) welding current circuits to detect the electrically conductive connection 20 could also be carried out by an external testing unit, for example. For this purpose, the control units 9$i$ of the welding current circuits transmit the recorded welding parameters Pi to the external testing unit (e.g. via a suitable wireless or wired interface) and the external testing unit compares the recorded welding parameters Pi and detects the presence of an electrically conductive connection if there is a simultaneous change in the welding parameters Pi (of course, changes that result from the welding processes being carried out are ignored). The external testing unit can be e.g. a higher-level control unit, for example a welding robot, etc. If a communication link 11 is provided between the welding tools A, B, this can advantageously be used to detect the electrically conductive connection 20 without an external testing unit, as already described in detail.

If an electrically conductive connection 20 between the welding current circuits was detected, the multiple welding method can be stopped, for example, and the user could be prompted e.g. to clean the welding device 1. It would be conceivable for a preferably analog, digital, acoustic, optical or haptic signal to be generated for this purpose by means of a suitable signaling unit. The user can then check the welding device and remove any spatter bridges.

As already explained, a separate cleaning station with a suitable cleaning means could also be provided in an automated welding system in which the welding torch 4 is moved by a welding robot, After detecting the electrically conductive connection 20 between the welding current circuits, the welding robot could, for example, automatically move the welding torch 4 to the cleaning station where it could be cleaned of spatter bridges using the cleaning means. Of course, this can also be done by an automated cleaning process or manually by a user.

The multiple welding method does not necessarily have to be interrupted upon detection of the electrically conductive connection 20 between the welding current circuits, however. It would also be possible to finish a welding operation that has just been carried out, for example one or more weld seams, and only then clean the welding torch. For example, a weld seam may be completed despite any unstable welding processes at the electrodes, rather than interrupting the multiple welding method while the weld seam is being produced. This can be advantageous despite a possibly reduced welding quality, in order to avoid undesired interruptions in a weld seam.

For a better understanding of the invention, FIG. 4 shows a simplified electrical equivalent circuit diagram of a welding device 1, which substantially corresponds to the welding device 1 shown in FIG. 1. There is only an indication of the welding device 1 in FIG. 4 and it only shows the essential components of the welding current circuits. In a known manner, the two welding current sources 2A, 2B of the two welding tools A, B (not shown) are connected to the common welding torch 4, in particular to the contact tubes 18A, 18B provided thereon, by means of current lines 13A, 13B. The welding wires 3A, 3B (as consumable electrodes EA, EB) are supplied to a workpiece 6 in the contact tubes 18A, 18B. The welding wires 3A, 3B are each supplied to a separate weld point 15A, 15B and are each melted off by an arc LA, LB. Of course, a common weld point 15 could be provided for both welding wires 3A, 3B. In order to close the two welding current circuits, the welding current sources 2A, 2B are each connected to the workpiece 6 by means of a ground line 8A, 8B.

The two normally separate welding current circuits are shown in the equivalent circuit diagram, with each welding current circuit having an electrical voltage source 2A, 2B (=welding current source 2A, 2B) and ohmic equivalent resistances Ri. The voltage sources 2A, 2B provide the welding voltage UA, UB during operation, as a result of which the welding current IA, IB flows in the relevant welding current circuit, e.g. as shown in FIG. 3 on the basis of the pulse welding processes. Only the essential individual resistances are shown here in simplified form as equivalent resistances. These are an arc resistance RLA, RLB of the arcs LA, LB, a welding wire resistance R3A, R3B of the welding wires 3A, 3B and a line resistance R13A, R13B of the current lines 13A, 13B. Of course, other resistances Ri, e.g. a ground line resistance R8A, R8B or a workpiece resistance R6 or an internal resistance RAi, RBi, could also be taken into account, but they are not shown here.

If there is then a spatter bridge between the contact tubes 18A, 18B, this will result, as described, in an electrically conductive connection 20, as indicated in FIG. 4 by the central connection of the two welding current circuits, respectively between the line resistor 13A, 13B and the welding wire resistor R3A, R3B. The ohmic connection resistance R20 of the electrically conductive connection 20 is shown here as a variable resistance since this can vary depending on the size and shape of the spatter bridge. If the connection resistance R20 of the electrically conductive connection 20 is negligibly small, this essentially means that in there is a short circuit between the two welding current circuits. In principle, the larger and denser the spatter bridge, the lower the connection resistance R20 of the electrically conductive connection 20 will be.

According to the first embodiment, a test parameter (e.g. a test voltage Uip) is applied in one of the two welding current circuits (before or after the end of the multiple welding method) and a welding parameter Pi is simultaneously recorded in the other welding current circuit, for example from the relevant control unit 9$i$ (not shown) or a suitable measuring device. Normally, the two welding current circuits are electrically isolated from one another, which is why the recording of the welding parameter Pi provides a result that does not fulfill the specified test criterion (e.g. because a measured voltage Ui as the welding parameter Pi is below a specified threshold voltage UiS as the test criterion). However, if there is a spatter bridge between the contact tubes 18A, 18B, as shown in FIG. 4, a certain connection current I20 flows via the electrically conductive connection 20 into the other welding current circuit, which influences the recorded welding parameter Pi in the other welding current circuit.

This influence can be detected via the specified test criterion and the presence of a spatter bridge can be inferred therefrom. For example, a specified threshold voltage UiS could be specified as the test criterion and the spatter bridge could be detected if the measured voltage Ui (as the recorded welding parameter Pi) reaches or exceeds the specified threshold voltage UiS. The magnitude and curve of the current I20 and the recorded welding parameter Pi result from the electrical laws and are substantially dependent on the magnitude and type of the test parameter (e.g. test voltage Uip in the form of a constant voltage, a time-variable function, etc.), the connection resistance R20 and the actual resistances Ri of the welding current circuits. The connection resistance R20 of the electrically conductive connection 20 is substantially set on the basis of the size, composition and the structure of the spatter bridge.

In the second embodiment (while the multiple welding method is being carried out) a welding parameter Pi is recorded in each of the two welding current circuits. Normally (in the case of welding current circuits that are electrically isolated from one another), the recorded welding parameters Pi have certain known time curves depending on the welding process carried out, for example as shown in FIG. 3 on the basis of the time curves of the welding currents IA, IB of two pulse welding processes, if a spatter bridge then forms between the contact tubes 18A, 18B on the welding torch 4, an electrically conductive connection 20 with a connection resistance R20 is established between the welding current circuits, as a result of which the two welding current circuits influence each other electrically. The spatter bridge is detected in that a change in the recorded welding parameter Pi occurs substantially simultaneously in both welding current circuits, as indicated in FIG. 3 at time tX. At this point it should be noted to again that the simultaneous changes in the welding parameters Pi are of course only changes that are not caused by the welding processes themselves, whose time curves of the welding parameters Pi are specified or known. A simultaneous change in the recorded welding parameters Pi resulting from an electrically conductive connection 20 between the welding current circuits is therefore e.g. not a deliberate or expected change in the welding parameters Pi, due to the welding process that is being carried out, which merely happens to occur simultaneously.

In the case of an electrically conductive connection 20 with a relatively low (substantially negligible) connection resistance R20 (substantially corresponds to a short circuit), the magnitude of the change in the recorded welding parameter Pi (welding current I, welding voltage U, welding power PSi, etc.) is approximately the same in both welding current circuits. However, a spatter bridge can also have a certain (non-negligible) connection resistance R20, which can lead to the magnitude of the changes in the recorded welding parameters Pi in the welding current circuits also being different (results from the known laws of the voltage divider), However, the change in the recorded welding parameters Pi occurs simultaneously in both welding current circuits, as shown in FIG. 3, as a result of which the presence of a spatter bridge is detected.

The method described can of course also be applied to a welding device 1 having more than two welding tools A, B, . . . k and/or to a welding device 1 having one or more non-consumable electrodes (TIG).

The invention claimed is:

1. A method for carrying out a multiple welding method, in which at least two electrodes each having a welding current circuit are each used to carry out a welding process on a workpiece, the method comprising:
applying a test parameter to one of the at least two welding current circuits before a start or after an end of the multiple welding method and
one of:
recording at least one electrical welding parameter in at least one other welding current circuit, with an electrically conductive connection between the at least two welding current circuits being detected when the recorded welding parameter is influenced by the test parameter and fulfills a predetermined test criterion, or
recording at least one electrical welding parameter in each welding current circuit during the multiple welding method, with an electrically conductive connection between the at least two welding current circuits being detected when the recorded welding parameters change simultaneously.

2. The method according to claim 1, wherein a consumable electrode in the form of a welding wire is provided for at least one of the at least two electrodes, with the welding wire being supplied to a welding point on the workpiece and being consumed at the welding point by an arc which burns between the welding wire and the workpiece and is controlled by the relevant welding process in order to form a weld seam.

3. The method according to claim 1, wherein a non-consumable electrode is provided for at least one of the at least two electrodes, with an additive being supplied to a welding point on the workpiece and the additive being melted off at the welding point by an arc which burns between the non-consumable electrode and the workpiece and is controlled by the relevant welding process in order to form a weld seam.

4. The method according to claim 1, wherein a pulse welding process, a welding process with reversing welding wire feed, a spray arc welding process, a welding process with a rotating arc or a short arc welding process is used.

5. The method according to claim 1, wherein a welding current, a welding voltage, a welding resistance or a period duration or pulse frequency of a welding cycle of a welding process or a variable derived therefrom is used as the electrical welding parameter, and/or wherein a test voltage, a test current or a variable derived therefrom is provided as the test parameter.

6. The method according to claim 1, wherein a current-controlled welding process is used on at least one of the at least two electrodes in which a welding current of the welding current circuit is regulated, or a voltage-controlled welding process is used in which a welding voltage of the welding current circuit is regulated, and, in the current-controlled welding process, an electrical welding parameter different from the welding current is recorded and, in the voltage-controlled welding process, an electrical welding parameter different from the welding voltage is recorded, in order to detect the electrically conductive connection.

7. The method according to claim 1, wherein, when the electrically conductive connection between the at least two welding current circuits is detected, a is generated before the start or after the end of the multiple welding method and/or wherein, when the electrically conductive connection between the at least two welding current circuits is detected during the multiple welding method that is being carried out, the multiple welding method is interrupted and/or a is generated.

8. A welding device for carrying out a multiple welding method, the welding device comprising:
at least two electrodes, wherein each of the at least two electrodes has its own welding current circuit and each of the at least two electrodes has a control unit, which is provided in the welding device,
the at least two control units being configured to control the welding current circuits of the at least two electrodes in order to carry out a welding process with each of the at least two electrodes on a workpiece, wherein a control unit of at least one electrode of the at least two electrodes is configured to apply a test parameter to the welding current circuit of the at least one electrode before a start or after an end of the multiple welding method and wherein a control unit of at least one other of the at least two electrodes is provided to record at least one electrical welding parameter in the welding current circuit of the at least one other electrode, and wherein, one of:
the welding device is configured to detect an electrically conductive connection between the at least two welding current circuits when the recorded welding parameter is influenced by the test parameter and a specified test criterion is fulfilled or the control units of the at least two electrodes are each configured to record at least one electrical welding parameter in their welding current circuit during the multiple welding method and the welding device is configured to detect an electrically conductive connection between the at least two welding current circuits when the recorded welding parameters change simultaneously.

9. The welding device according to claim 8, one of:
wherein the at least control units are interconnected by a communication link in order to exchange synchronization information, the control unit of the at least one other electrode being configured to detect the electrically conductive connection between the at least two welding current circuits or wherein the welding device further comprises a testing unit which is connected to the at least two control units in the welding device for detecting the electrically conductive connection between the welding current circuits of the at least two electrodes.

10. The welding device according to claim 8, wherein a consumable electrode in the form of a welding wire is provided as at least one electrode of the at least two electrodes, with a welding wire feed unit being provided on the welding device in order to feed the welding wire to a welding point on the workpiece and wherein the control unit of the consumable electrode is configured to control the welding process in order to melt off the welding wire at the welding point by an arc burning between the welding wire and the workpiece to form a weld seam.

11. The welding device according to claim 8, wherein a non-consumable electrode is provided as at least one electrode of the at least two electrodes, with a supply unit being provided on the welding device in order to supply an additive to a welding point on the workpiece and wherein the control unit of the non-consumable electrode is configured to control the welding process in order to melt off the additive at the welding point by an arc burning between the non-consumable electrode and the workpiece to form a weld seam.

12. The welding device according to claim 8, wherein a welding current, a welding voltage, a welding resistance or a period duration or pulse frequency of a welding cycle of a welding process or a variable derived therefrom is provided as the electrical welding parameter, and/or wherein a test voltage, a test current or a variable derived therefrom is provided as the test parameter.

13. The welding device according to claim 8, wherein the control unit of at least one electrode of the at least two electrodes is configured to one of: carry out a current-controlled welding process in which a welding current of the welding current circuit is regulated or carry out a voltage-controlled welding process in which a welding voltage of the welding current circuit is regulated, and wherein the recorded welding parameter for detecting the electrically conductive connection between the at least two welding current circuits is, in the current-controlled welding process, an electrical welding parameter different from the welding current and, in the voltage-controlled welding process, an electrical welding parameter different from the welding voltage.

14. The welding device according to claim 8, wherein the at least two electrodes are arranged on a common welding torch, the welding torch being movable manually or with a manipulation device relative to the workpiece and/or wherein the at least two electrodes are each arranged on a separate welding torch, the welding torches being movable manually or with a manipulation device relative to the workpiece and relative to one another.

15. The welding device according to claim 8, wherein a signaling unit is provided in the welding device in order to signal the detection and/or non-detection of an electrically conductive connection between the welding current circuits of the at least two electrodes.

16. The method according to claim 4, wherein the pulse welding process, the welding process with reversing welding wire feed, the spray arc welding process, the welding process with a rotating arc or the short arc welding process is used for at least one welding process of an electrode.

17. The method according to claim 5, wherein the variable derived from the welding current, the welding voltage, the welding resistance or the period duration or pulse frequency of the welding cycle of the welding process is a welding power.

18. The method according to claim 7, wherein the generated signal is an analogue, digital, acoustic, optical or haptic signal.

19. The welding device according to claim 8, wherein the variable derived from the welding current, the welding voltage, the welding resistance or the period duration or pulse frequency of the welding cycle of the welding process is a welding power.

20. The welding device according to claim 15, wherein the signaling unit provides an analogue, digital, acoustic, optical or haptic signal to signal the detection and/or non-detection of an electrically conductive connection between the at least two welding current circuits.

* * * * *